United States Patent [19]
Fujisaki

[11] Patent Number: 4,877,945
[45] Date of Patent: Oct. 31, 1989

[54] IC CARD HAVING A FUNCTION TO EXCLUDE ERRONEOUS RECORDING

[75] Inventor: Kunio Fujisaki, Aichi, Japan
[73] Assignee: Hitachi, Ltd., Tokyo, Japan
[21] Appl. No.: 118,603
[22] Filed: Nov. 9, 1987

[30] Foreign Application Priority Data
Nov. 10, 1986 [JP] Japan ................................. 61-265484

[51] Int. Cl.⁴ .............................................. G06F 15/30
[52] U.S. Cl. .................................... 235/379; 235/436; 235/441; 340/825.5; 902/26
[58] Field of Search .................... 902/26, 38; 235/437, 235/441, 492, 379, 436; 340/825.3, 825.5

[56] References Cited

U.S. PATENT DOCUMENTS

| | | | |
|---|---|---|---|
| 4,683,372 | 7/1987 | Matsumoto | 902/26 X |
| 4,736,094 | 4/1988 | Yoshida | 235/379 |
| 4,780,602 | 10/1988 | Kawana et al. | 235/492 X |

FOREIGN PATENT DOCUMENTS 59-11478 1/1984 Japan .
59-107491 6/1984 Japan .

OTHER PUBLICATIONS
Nikkei Electronics, Oct. 21, 1985, pp. 127–154.

Primary Examiner—David L. Trafton
Attorney, Agent, or Firm—Fay, Sharpe, Beall, Fagan, Minnich & McKee

[57] ABSTRACT

An IC card system comprises an IC card, each card including a microprocessor, a communication interface, a power supply interface, and memories such as RAM, ROM and EEPROM, and an external device such as a terminal. The terminal functions to supply electric power and send commands to the IC card, and includes a card reader/writer effecting data processing for transactions. The commands include a start command and an end command for the transaction data processing for the IC card connected therewith, and the IC card comprises a validity data flag table within the EEPROM. When a start command is received, the flag table records the validity flag in an invalid state and holds such state as long as an end command is not received.

7 Claims, 7 Drawing Sheets

| BIT | CONTENT |
|---|---|
| $2^7$ | VALIDITY FLAG |
| $2^6$ | NOT USED |
| ( | ( |
| $2^0$ | NOT USED |

1 BIT
—"0" DATA INVALID
—"1" DATA VALID (REMARK) DATA ARE ADDED ONLY TO COMMAND "WRITE"

(REMARK) DATA ARE ADDED ONLY TO RESPONSE "DATA"

"OPEN" PROCESSING

"CLOSE" PROCESSING

IC CARD HAVING A FUNCTION TO EXCLUDE ERRONEOUS RECORDING

BACKGROUND OF THE INVENTION

The present invention relates to an IC card having a function to exclude erroneous recording (abnormal or invalid recording) and in particular to a processing method for an IC card system and a structure of the IC card permitting to detect destruction of memory data and prevent an erroneous transaction operation.

As IC cards are utilized more widely for terminal processing devices, etc. in a banking system, in order to carry out correctly various types of processings and raise reliability of the IC cards, various methods are proposed for preventing erroneous transaction operations of the IC cards.

For example, by the method disclosed in JP No. A-59-11478 an attempt is made to supply stably electric power from the exterior by disposing a mechanism transmitting and receiving signals by using light having a wavelength band different from the wavelength band used for the optical electric power supplying mechanism such as a solar cell between a device effecting the processing for an IC card and the IC card in order to increase the freedom of the contact position.

Further, for example, by the method disclosed in JP No. A-59-107491 there is disposed means for outputting voltage information values concerning the write-in voltage necessary for write-in information in a memory element such as a programmable read only memory (EPROM) of the IC card and an external device generates a suitable write-in voltage according to the write-in voltage information in order to prevent erroneous operations such as destruction of the memory data, write-in failure, etc.

Since the principal object of the prior art techniques described above is to supply electric voltage given from the exterior to the IC card, when the power supply from the exterior is interrupted by some external factors or subjected to temporary variations in voltage, e.g. in the middle of the memory writing of the IC card, destruction of the memory data or lowering in the reliability of data due to imperfect updating of the memory may be produced. Furthermore, when undetermined data being held, the memory is connected with an external device, since the external device cannot recognize that the data are undetermined, this gives rise to an erroneous operation. An example of the IC card using electrically erasable programmable read only memory (EEPROM) is disclosed in Nikkei Electronics, Oct. 21, 1985, pp. 127-154, which mentions the function of EEPROM to prevent erroneous write-in operations, but no reference is made therein to prevent logical destruction of transaction data.

Further, if an IC card holding such undetermined data is used as a bankbook or for credit transactions, since the balance is inexact, either it is impossible to defray money to the IC card holder or on the contrary it can happen to defray money more than the real balance. Consequently, the reliability of various transactions in the application fields of IC cards is lowered.

SUMMARY OF THE INVENTION

An object of the present invention is to provide an IC card provided with a function permitting to record and to let the operator know that data recording in the memory is hindered and a processing method to exclude erroneous recording in an IC card system using it.

Another object of the present invention is to provide an IC card system permitting to record abnormality in electric power supplied from the exterior, to inform an external device of the abnormality in the power supply on the basis of the record and to display the invalidity of data which are stored in the memory of the IC card when the power supply is abnormal.

According to one feature of the present invention, in a type of the IC card system provided with IC cards, each of which has a microprocessor and memories, and an external device, in which the card is fed with electric power by the external device and data processing is effected according to instructions coming from the external device, it comprises means with which the external device and the IC card communicate with each other (i.e. communication line), means for informing the IC card from the external device of the start and the end of the processing by transmitting e.g. a command "OPEN" and a command "CLOSE", respectively normally once for each transaction by using the communication line, recorded data validity/invalidity indicating means for recording the communicated content in a non-volatile memory among the memories in the form of a validity flag by means of the communication line and the commands, and means for communicating the validity of the recorded data to the external device e.g. in the form of a successful response "OK" and a fault response "NG" according to the state of the validity flag, whereby, when any hindrance or abnormality arises during the data processing, the validity flag in the non-volatile memory remains invalid because of failure of the communication of the command CLOSE from the external device through the communication line, and when the IC card receives a data processing instruction from the external device at the moment of the following utilization thereof, the IC card sends a response corresponding to the flag representing invalidity of the data held in the non-volatile memory to the external device and in this way informs the external device of the fact that the data held by itself are invalid.

According to the present invention, when an abnormal state arises during the execution of the processing in the IC card because of an instantaneous interruption of the power supply, the validity flag indicating the validity of the data continues to be in the OFF state in the non-volatile memory of the IC card. Next time, when the IC card is connected with the external device and receives a processing instruction from the latter, it sends a response NG to the external device on the basis of the validity flag of the OFF state stored in the non-volatile memory contained in the card and in this way, informs the external device of the fact that the data held therein are invalid.

For this reason, even if any hindrance arises in the power supply during the execution of the processing in the IC card, it is possible to prevent erroneous operation due to uncertain or undetermined data in the transactions by means of the IC card. The present invention essentially intends to promote the security of the transactions concerning transaction data treated in the IC card by defining the invalidity of the transaction data, when the external power supply is hindered or fails. In fact, it is practically difficult to contain a battery having a necessary capacity except for a solar cell in a thin card, whose thickness is as small as 0.76 mm.

DESCRIPTION OF THE PREFERRED EMBODIMENTS

The present invention will be described below, referring to the attached drawings.

Figure 2:
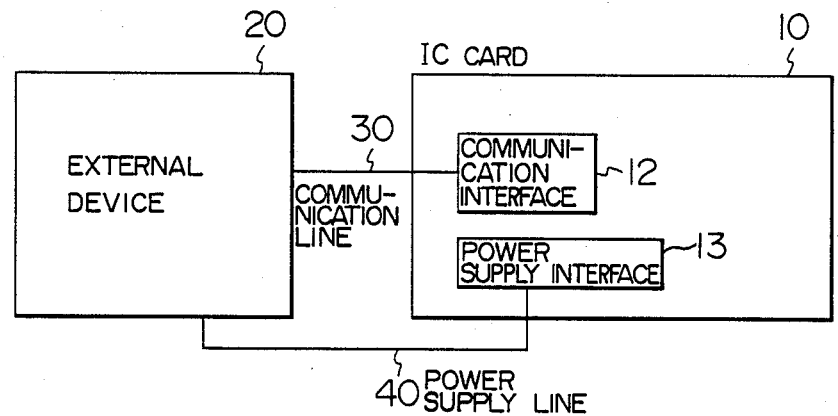
FIG. 2 is a block diagram illustrating the structure of an IC card system in an embodiment of the present invention.

FIG. 2 shows a block diagram illustrating the structure of an IC card system in an embodiment of the present invention.

The IC card system of this embodiment is provided with an external device 20 for a system including a terminal, which can effect data communication and processing of transactions with IC cards, and IC cards 10. A communication interface 12 and a power supply interface 13 including contact pins for receiving power supply from the exterior in the IC card are connected with the external device 20 through a communication line 30 and a power supply line 40.

Figure 1:
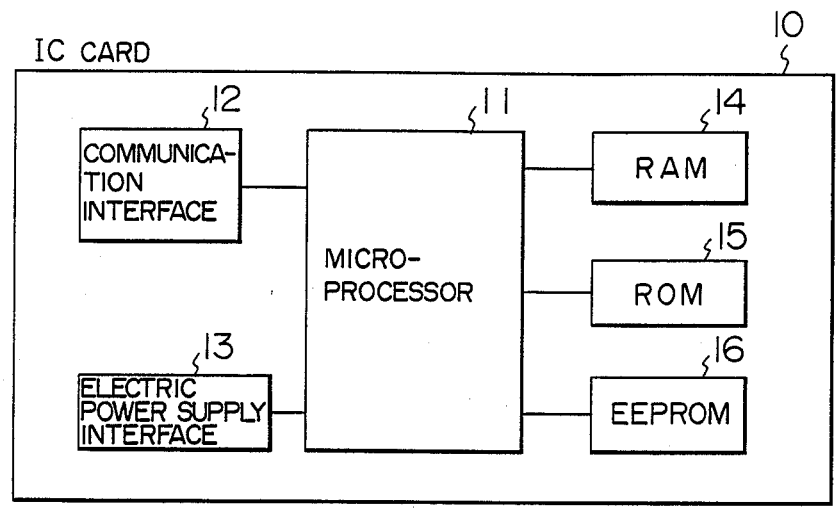
FIG. 1 is a block diagram illustrating the structure of an IC card in an embodiment of the present invention.

FIG. 1 shows a block diagram illustrating the structure of the IC card in an embodiment of the present invention.

The IC card of this embodiment is provided with a microprocessor 11, the communication interface 12 for communication connection with the external device 20, the power supply interface 13 for receiving power supply from the external device, a random access memory (hereinbelow abbreviated to RAM) 14 constituting a program work area, etc., a read only memory (hereinbelow abbreviated to ROM) 15 for storing programs, etc. and an electrically erasable programmable read only memory (hereinbelow abbreviated to EEPROM) 16 for storing transaction data, pass words, etc. and receives power supply, connected with the external device 20 through the contact pins. For example, a one-chip IC, type HD 65901 fabricated by Hitachi is available for this purpose, which includes a 8-bit CPU 11, a 128-byte RAM 10, a 3k-byte ROM 15 and a 2k-byte EEPROM 16.

Figures 3, 4:
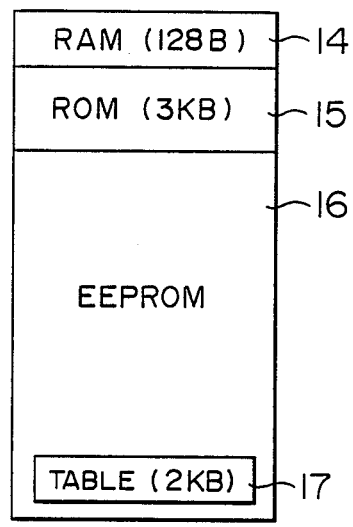
FIG. 3 is a diagram for explaining a memory map in an embodiment of the present invention.
FIG. 4 is a diagram for explaining a table in an embodiment of the present invention.

The memory map in the IC card includes an RAM 14, an ROM 15 and an EEPROM 16 and a table 17 having a memory capacity of e.g. 2k bytes is formed on the EEPROM 16, as indicated in FIGS. 1, 3 and 4.

Further, the table 17 includes a validity flag indicating the validity of transaction data held by the IC card 10 for every operation unit or every transaction, and this flag indicates "0" in the case where the transaction data are invalid and "1" in the case where the data are determined to be valid. Instead thereof, the flag indication may be $(00)_{16}$ when they are invalid and $(01)_{16}$ when they are valid.

Figure 5:
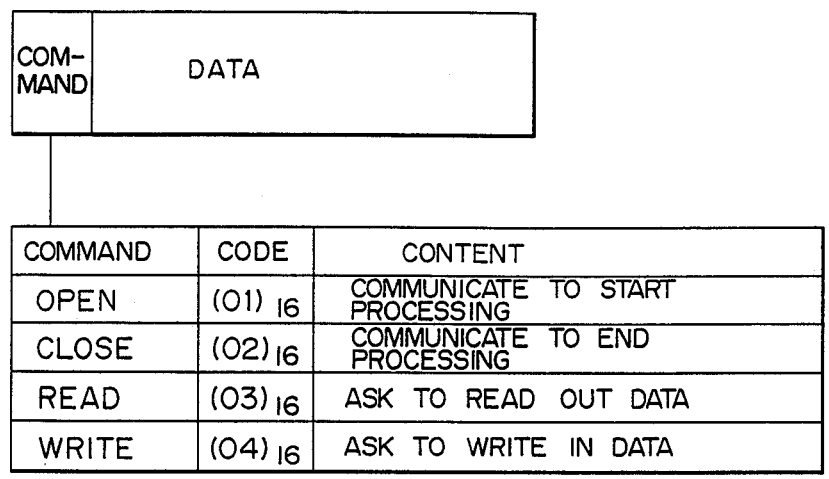
FIG. 5 is a diagram for explaining a command in an embodiment of the present invention.

In the IC card system according to the present embodiment, as indicated in FIG. 5, a command "OPEN" communicating the start of processing, a command "CLOSE" communicating the end of the processing, a command "READ" requesting read-out of the transaction data, and a command "WRITE" requesting write-in of the transaction data are used and transaction data are added only to a command "WRITE".

Figure 6:
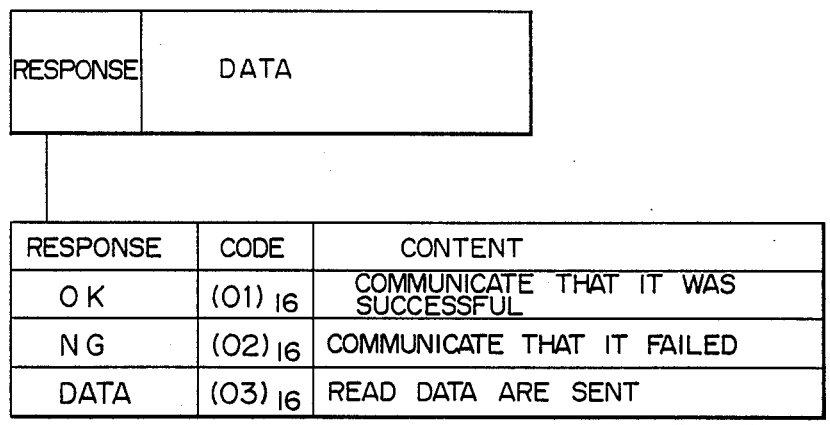
FIG. 6 is a diagram of explaining a response in an embodiment of the present invention.

Further, a response "OK" communicating that the access to the IC card was successful, a response "NG" communicating that it was unsuccessful, and a response "DATA" communicating that the data read out from the IC card will be transmitted are used, as indicated in FIG. 6, and the transaction data are added only to the response "DATA".

The operation of the present embodiment will be explained below, referring to FIGS. 7–12.

When the IC card 10, whose operation is controlled by a microprocessor 11, is connected with the external device 20, as indicated in FIGS. 1 and 2, a voltage is applied to the power supply interface 13 through the power supply line 40 and the program stored in the ROM 14 is executed under the control of the microprocessor 11.

In this way, when power is supplied from the external device 20 such as an IC card reader/writer to the IC card, the IC card carries out a processing according to a command instruction sent by the external device 20, returns the result of the processing to the external device 20 as a response, and waits for a following command.

Figure 12:
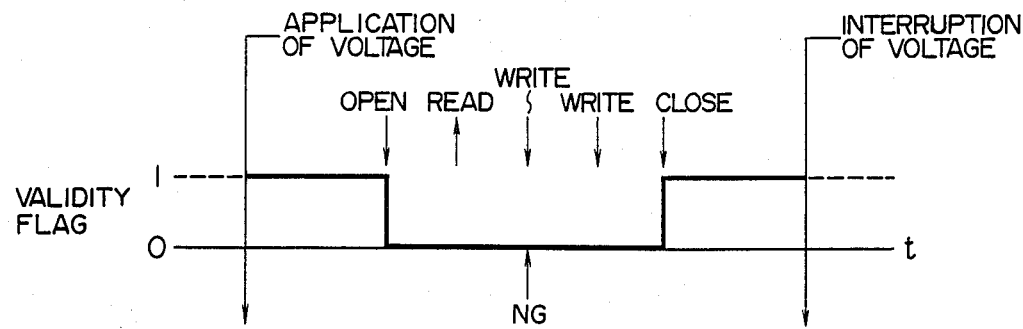
FIG. 12 is a time chart for a validity flag in an embodiment of the present invention.

There are four kinds of commands, i.e. "OPEN", "CLOSE", "READ" and "WRITE", as indicated in FIG. 5, and various kinds of commands are received in an operation sequence, e.g. as indicated in FIG. 12.

The command "OPEN" and the command "CLOSE" are issued normally once for each transaction operation between the IC card and the external device such as a terminal.

Figure 7:
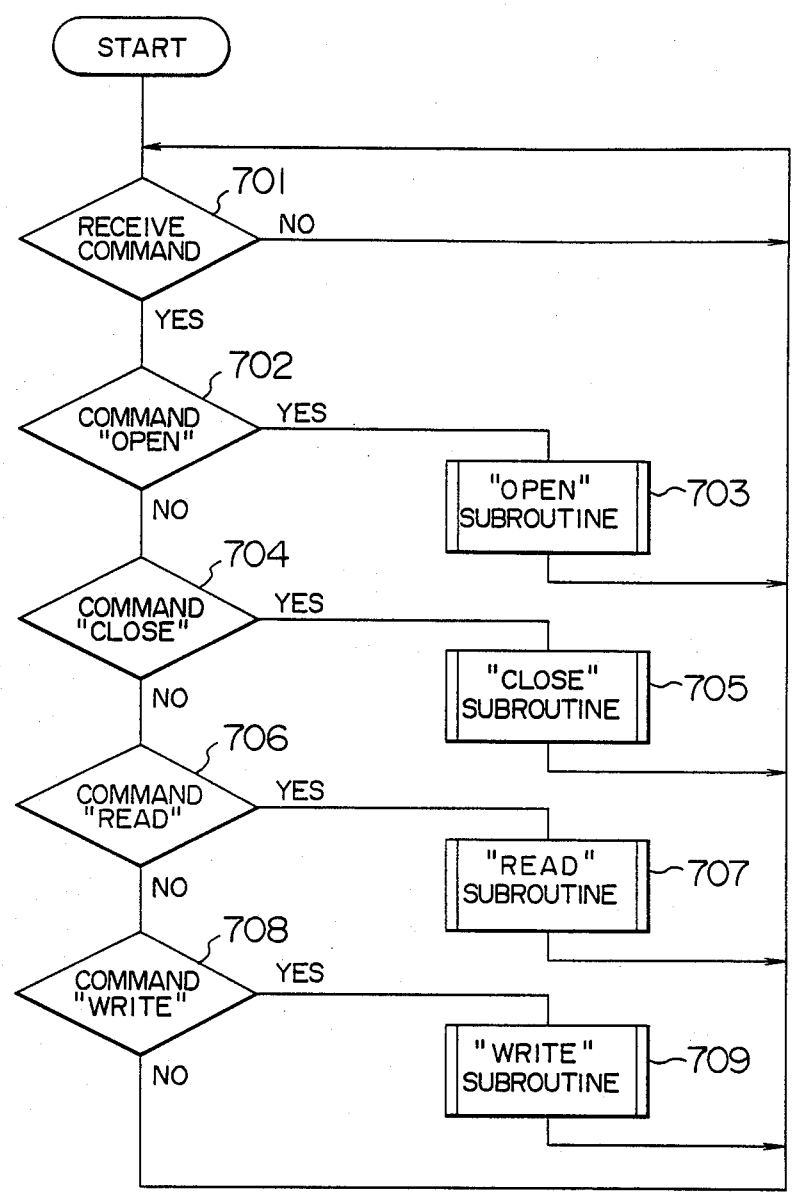
FIG. 7 is a flow chart indicating the operation of the main routine for the IC card in an embodiment of the present invention.

At first, referring to the operation flow chart of the main routine indicated in FIG. 7, when the IC card 10 receives a command through the communication interface 12, its code representing the kind is judged by the microprocessor 11 (701).

If the command is "OPEN" (702), the "OPEN" subroutine (FIG. 8) is executed (703) and if it is "CLOSE" (704), the "CLOSE" subroutine (FIG. 9) is executed (705). Further, if the result of the command judgment is "READ" (706), the "READ" subroutine (FIG. 10) is executed (707) and if it is "WRITE" (708), the "WRITE" subroutine (FIG. 11) is executed (709).

Figure 8:
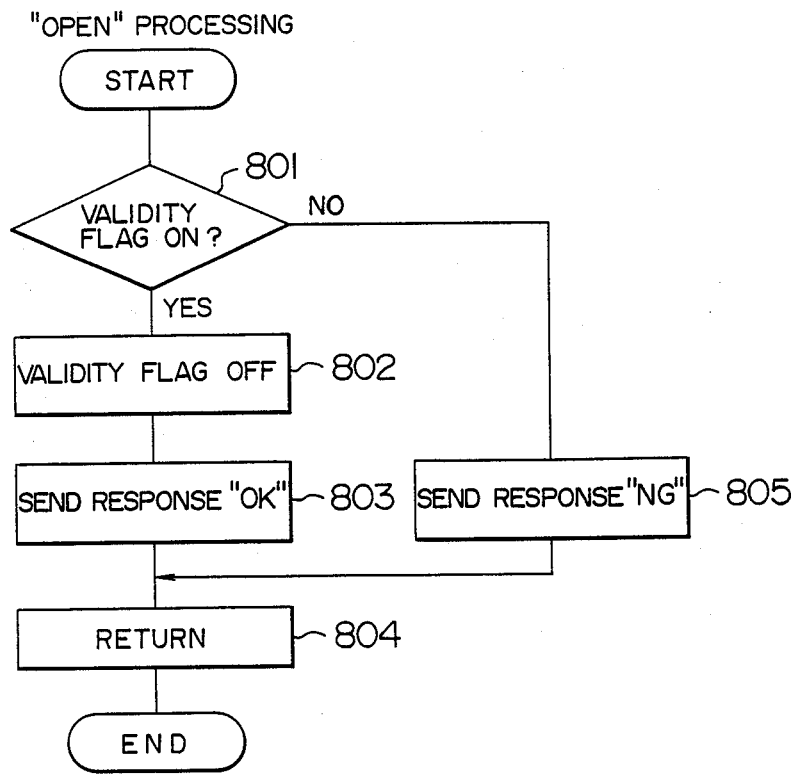
FIG. 8 is a flow chart indicating the operation of the OPEN subroutine for the IC card in an embodiment of the present invention.

As indicated by the time chart for the validity flag in FIG. 12, at first, when a command "OPEN" is received (702), the "OPEN" subroutine is executed (703) and the validity flag in the table 17 is judged (801), as indicated in FIG. 8.

If the validity flag is "ON", since it is already determined that the data are valid, their flag is turned to "OFF" (802) and a valid response, i.e. "OK" is sent to the external device 20 (803). The external device 20 receives the "OK", recognizes that the data in the IC card 10 are valid, and returns to the main routine. Then, a succeeding processing request is transmitted (804).

If the validity flag is "OFF", since this fact means that the transaction data within the IC card invalid, a response "invalid", i.e. a response "NG" is sent to the external device 20 (805) and the procedure returns to the main routine (804).

Figure 10:
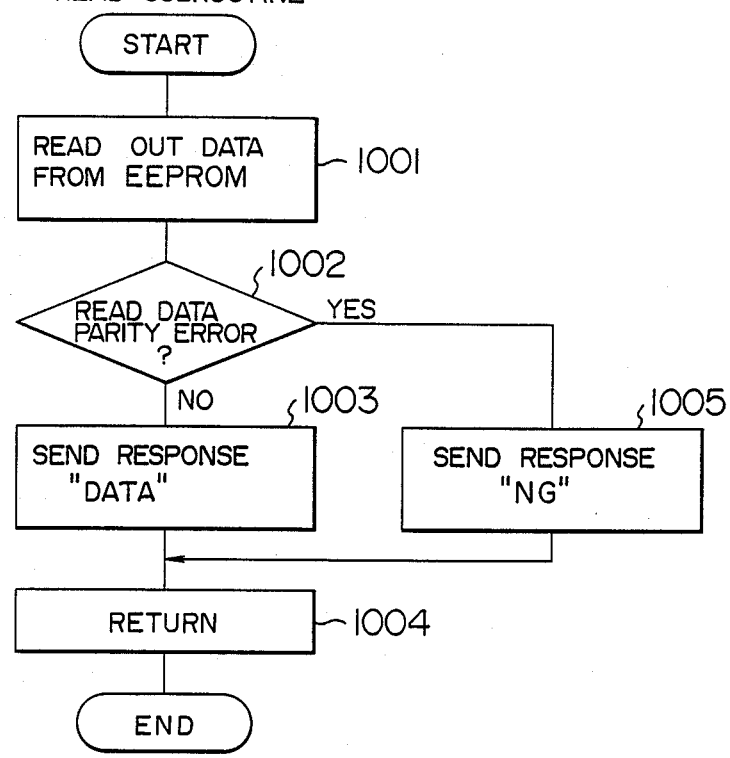
FIG. 10 is a flow chart indicating the operation of the READ subroutine for the IC card in an embodiment of the present invention.

Next, when a command "READ" is received (706), the "READ" subroutine is executed (707). Then, as indicated in FIG. 10, at first, the microprocessor 11 reads out the transaction data from the EEPROM 16 (1001). When it is judged that the read data are normal (1002), response data are added thereto and the read data are sent to the external device 20 through the communication interface 12 (1003).

When the microprocessor 11 judges that the read data include parity errors (1002), it sends a response "NG" to the external device 20 (1005).

In this way, the "READ" subroutine is executed and the procedure returns to the main routine (1004).

Figure 11:
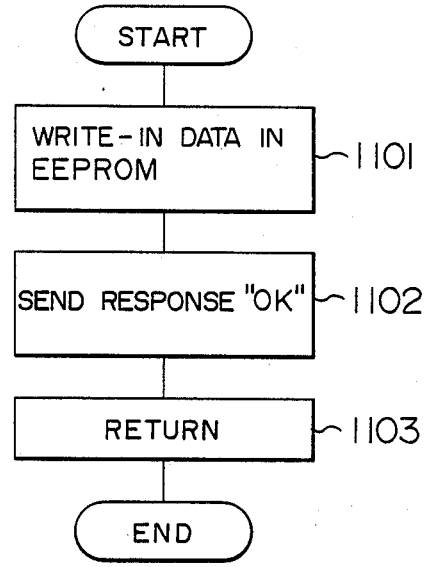
FIG. 11 is a flow chart indicating the operation of the WRITE subroutine for the IC card in an embodiment of the present invention.

Furthermore, the external device 20 can refer to the read data and update them. In the case where new data are written in the IC card 10, divided into 2, as indicated e.g. in FIG. 12 as an example, the command "WRITE" accompanied by data to be written are sent twice. In this case, when the IC card receives the command "WRITE" accompanied by the first half of the data to be written from the external device 20, it writes the data in the EEPROM 16 (1101) and sends a response "OK" to the external device 20 (1102), as indicated in FIG. 11. Further, when it receives the second half of the data to be written, it writes similarly the data in the EEPROM 16 (1101) and sends a response "OK" (1102), and the procedure returns to the main routine (1103).

In this way, when the processing including read-/write for transactions from/to the IC card 10 is terminated, e.g. according to instructions of the user of the IC card or a predetermined procedure the external device 20 sends a command "CLOSE". When the IC card receives the command "CLOSE", it turns-on the validity flag in the table 17 (901), as indicated by the flow chart in FIG. 9, sends a response "OK" (902) and returns in program, i.e. returns to the main program (903).

Furthermore, when the power supply is switched off or instantaneously interrupted, or when noise is produced, et. between the command "WRITE" accompanied by the first half of the data to be written and that accompanied by the second half of the data to be written, no command "CLOSE" is transferred to the microprocessor 11 and the validity flag in the table 17 on the EEPROM 16 continues to be in the OFF state. For this reason, for the next use of the IC card, when the external device 20 sends a command "OPEN" to the IC card 10, if the validity flag is OFF (801), a response "NG" is returned from the IC card 10 (805) and the external device 20 recognizes that the data held by the IC card 10 are undetermined.

In this way, when abnormal power supply such as interruption of the power supply, etc. is produced during a write operation of the IC card or between a write operation and another, as a result, the IC card itself detects that there was produced a failure in the power supply and records it. Therefore, it is possible to prevent erroneous operation due to undetermined transaction data produced by noise or failure in the power supply.

Figure 13:
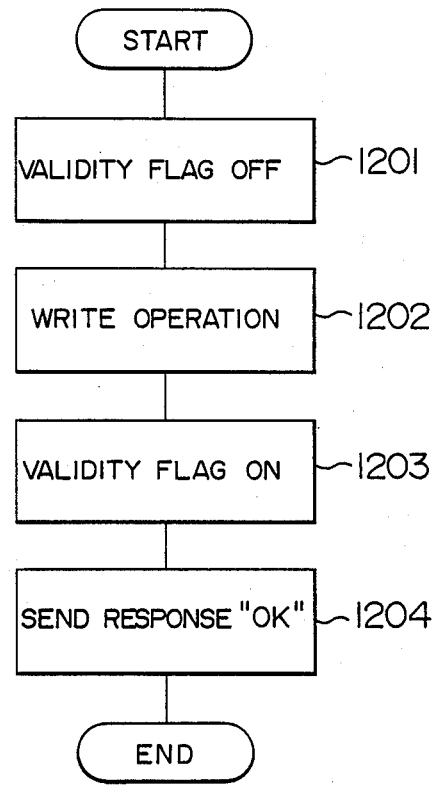
FIG. 13 is a flow chart indicating a modified example of the WRITE subroutine indicated in FIG. 11.

Furthermore, another method is possible by which the command "WRITE" is provided with a command, to which commands "OPEN" and "CLOSE" are added previously, and when it is asked by the external device 20 to write data, the IC card itself effects turning-on and turning-off of the validity flag before and after the write operation. In FIG. 13, such an operation is indicated by a flow chart including steps 1201-1204.

Figure 9:
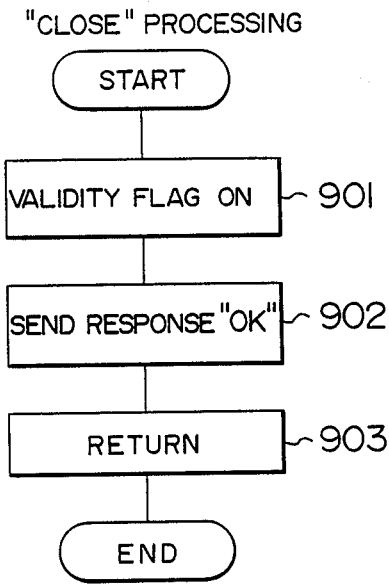
FIG. 9 is a flow chart indicating the operation of the CLOSE subroutine for the IC card in an embodiment of the present invention.

Further, in the case where an "NG" indicating that the data are invalid is transmitted as a response to the command "OPEN", since the validity flag is unconditionally turned-on, when a command "CLOSE" is sent by executing the subroutine indicated in FIG. 9, the reutilization of the IC card is also possible.

According to the present invention, since the external device can record rewritably the validity of the data held by the IC card in a fail-safe fashion and recognize it easily, it is possible to prevent erroneous operation due to the invalid transaction data recorded in the IC card and ensure the security of transactions by means of the IC card.

I claim:

1. An IC card used in an IC card system for performing transactions with the IC card having therein a microprocessor and memories in which said IC card is fed with power from an external device and a processing of transaction data is effected in accordance with instructions coming from the external device, comprising:

communication means for enabling the external device and the IC card to communicate with each other;

informing means for informing said IC card of instructions regarding the start and the end of the processing from the external device through said communication means;

generating means for generating information on the validity of transaction data based on instructions regarding the start and the end of the processing from the external device;

a non-volatile memory connected to said recording means, said communication means and said informing means for storing the information generated in said recording means; and means for communicating said information on the validity of the transaction data recorded in said non-volatile memory to said external device at the start of the next processing, wherein said non-volatile memory is a rewritable memory and includes a flag table storing a flag indicating the validity of the data held in said memory on the basis of a signal representing the start and the end of the processing applied from said external device, and wherein said microprocessor receives a signal of said start, it refers to said flag table, and said memory includes means, which, if the flag in said table indicates the state of validity, rewrites said flag to the state of invalidity and transmits a response for allowing for said external device to start the processing operation and if it receives a signal at the end, stores a program to rewrite said flag to the state of validity.

2. An IC card subjected to a data processing operation according to an instruction applied from an external device, comprising:
a microprocessor;
a memory including at least a non-volatile memory;
communication interface means for communicating with said external device, said instruction including at least a start command, an end command, a write command and a read command;
a flag table provided in said non-volatile memory for storing a flag indicating the validity of the data held in said memory on the basis of the start and end commands which said microprocessor receives through said communication interface means;
program means for controlling said flag, stored in said memory;
response means, which under the control of said program means, when said start command is received, refers to said flag table, if there exists the validity flag, rewrites it to the state of the invalidity and generates a response indicating that the start is successful, and to the contrary if there exists no validity flag, generates a response indicating that the start is unsuccessful; and
end command responding means for rewriting the state of the invalidity to the state of the validity, combined with said response means, referring to said flag table, when said end command is received.

3. An IC card according to claim 2, wherein said non-volatile memory is a rewritable memory and electric power is supplied from said external device thereto.

4. A processing method for preventing an erroneous recording in an IC card system combined with a IC card including a microprocessor and memories, and an external device combined with said IC card to effect a transaction data processing under power supplied by said external device to said IC card, while communicating with said IC card according to an instruction applied from said external device, comprising the steps of;
(a) providing a non-volatile memory in said IC card and making a validity flag table formed therein indicate the validity of the data stored in the IC card;
(b) supplying a start command and an end command at the moments of the start and the end of the data processing, respectively, from said external device;
(c) changing the state of validity into the state of invalidity by rewriting the flag in the IC card and sending a response allowing to start the processing operation to the external device and on the contrary inhibiting to send a response to the external device, if the table indicates the invalidity flag; and
(d) rewriting the state of invalidity to the state of validity in said flag table, when the IC card receives said end command.

5. A processing method according to claim 4, wherein, when said external device receives a response indicating the inhibition of the operation for the start command, it sends the end command to said IC card, rewrites the flag table to the state of validity.

6. A processing method according to claim 4, wherein said external device generates a read/write command,
said write command including the start command and the end command of the write-in operation and when the write command is generated, said steps (c) and (d) are executed.

7. An IC card for use in an IC card system comprised of an IC card and external device, the IC card comprising:
means for receiving data from the external device;
means for decoding the received data;
means for storing at least part of the decoded data;
means for writing the part of the decoded data to the storing means;
means for reading a validity status flag of the stored data at initiation of the communication with the external device, the validity status flag enabling the means for writing at a valid state;
means for transmitting the validity status of the stored data to the external device; and,
means for setting the validity status flag of the stored data to an invalid state after the initiation of communication, and resetting the flag to a valid state at an end of communication whereby an interrupted communication precludes resetting of the flag to a valid data state to avoid future communication between the card and external device.

* * * * *